(12) United States Patent
Burger et al.

(10) Patent No.: US 9,758,229 B2
(45) Date of Patent: Sep. 12, 2017

(54) METHOD OF AND AN ARRANGEMENT FOR IMPROVING THE LUBRICATION SYSTEM OF A PROPULSION DEVICE OF A MARINE VESSEL

(71) Applicant: WARTSILA FINLAND OY, Vaasa (FI)

(72) Inventors: Robert Burger, Tilberg (NL); Bart Van Der Ven, Waspik (NL); Peter Schalk, Wijk en Aalburg (NL); Koenraad Van Eersel, 's Gravenmoer (NL); Frank Kroot, Waalwijk (NL)

(73) Assignee: WARTSILA FINLAND OY (FI)

( * ) Notice: Subject to any disclaimer, the term of this patent is extended or adjusted under 35 U.S.C. 154(b) by 638 days.

(21) Appl. No.: 14/369,130

(22) PCT Filed: Dec. 3, 2012

(86) PCT No.: PCT/FI2012/051200
§ 371 (c)(1),
(2) Date: Jun. 26, 2014

(87) PCT Pub. No.: WO2013/098469
PCT Pub. Date: Jul. 4, 2013

(65) Prior Publication Data
US 2015/0021120 A1 Jan. 22, 2015

(30) Foreign Application Priority Data
Dec. 28, 2011 (FI) .................................... 20116328

(51) Int. Cl.
*B63H 20/00* (2006.01)
*B63H 21/38* (2006.01)
(Continued)

(52) U.S. Cl.
CPC .......... *B63H 21/386* (2013.01); *B63H 5/125* (2013.01); *B63H 20/002* (2013.01); *F16N 39/00* (2013.01);
(Continued)

(58) Field of Classification Search
CPC ....... B63H 21/386; B63H 5/125; F16N 39/00; F16N 39/002
See application file for complete search history.

(56) References Cited

U.S. PATENT DOCUMENTS 2,237,253 A 4/1941 Rosnell et al.
4,616,620 A * 10/1986 Paoluccio .............. F01M 13/00
123/41.86

(Continued)

FOREIGN PATENT DOCUMENTS

CN 202182305 U 4/2012

OTHER PUBLICATIONS

International Preliminary Report on Patentability issued by WIPO issued on Jul. 1, 2014, dated Jul. 10, 2014, for corresponding international PCT application No. PCT/FI2012/051200.
(Continued)

Primary Examiner — Stephen Avila
(74) Attorney, Agent, or Firm — Heslin Rothenberg Farley & Mesiti, P.C.; Victor Cardona, Esq.

(57) ABSTRACT

A method of and an arrangement for improving the lubrication system of a propulsion device of a marine vessel are specifically applicable in removing water from the lubrication oil of various types of thrusters. An inert gas is arranged from an inert gas source to flow through a gas cavity in the lubrication system for flushing moist gas from the cavity.

25 Claims, 4 Drawing Sheets (51) Int. Cl.
*F16N 39/00* (2006.01)
*B63H 5/125* (2006.01)

(52) U.S. Cl.
CPC .... *F16N 39/002* (2013.01); *B63H 2005/1256* (2013.01)

(56) References Cited

U.S. PATENT DOCUMENTS 7,479,048 B1 * 1/2009 Kohama ............. B63H 20/285
440/88 C
7,641,526 B1 1/2010 Bekker

OTHER PUBLICATIONS

International Search Report and Written Opinion, completed on Mar. 20, 2013, and dated Mar. 28, 2013, for corresponding PCT International Application No. PCT/FI2012/051200.

* cited by examiner

METHOD OF AND AN ARRANGEMENT FOR IMPROVING THE LUBRICATION SYSTEM OF A PROPULSION DEVICE OF A MARINE VESSEL

CROSS-REFERENCE TO RELATED APPLICATIONS

This application is a 371 National Phase of PCT International Application No. PCT/FI2012/051200 filed on Dec. 3, 2012, and published in English as WO 2013/098469 A1 on Jul. 4, 2013, which claims priority to Finnish Application No. 20116328 filed on Dec. 28, 2011, the entire disclosures of which are incorporated herein by reference.

TECHNICAL FIELD

The present invention relates to a novel method of and an arrangement for improving the lubrication system of a propulsion device of a marine vessel. The method and arrangement of the invention are specifically applicable in removing water from the lubrication oil of various types of thrusters. The method and arrangement of the invention are also applicable in removing gaseous hydrocarbons from gas-containing cavities present in the lubrication system of a thruster.

BACKGROUND ART

A thruster as here understood is such a propulsion device of a marine vessel that is formed of at least a propeller unit situated, at least in its operating position, beneath the hull of the marine vessel. The thruster may be a steerable one, a retractable one or a stationary one. The drive of the propeller may be arranged mechanically, hydraulically or electrically. Though the present invention covers all three drive options, the following exemplary description of the thruster concentrates on the structures required by the mechanical drive as it requires the most complicated mechanical arrangements. The electric and hydraulic drives have been only briefly discussed.

The exemplary thruster, when viewed from the standpoint of the lubrication has three main parts, i.e. the upper gearbox, the vertical shaft, and the lower gearbox. The upper gearbox includes the upper gear transmission that is formed of an angle gear transmitting power from a substantially horizontal drive shaft to the substantially vertical shaft. The upper gearbox forms normally an independently lubricated unit. The vertical shaft is normally formed of three parts, i.e. of a shaft extending downwardly from the upper gearbox, of a floating intermediate shaft, and of a pinion wheel shaft extending into the lower gearbox. The intermediate shaft may be coupled to the upper gearbox shaft and to the pinion wheel shaft with flexible or floating shaft couplings or the intermediate shaft may be replaced with a flexible or floating shaft coupling. The lower end of the vertical shaft, i.e. the pinion wheel shaft transmits the power to a substantially horizontal propeller drive shaft located within the lower gearbox.

If the thruster has an electric or hydraulic drive, the upper gearbox of the mechanical drive may be replaced with the electric or hydraulic drive. The shaft of the electric or hydraulic drive motor is vertical and connected, preferably by means of a flexible or floating coupling, to the intermediate shaft or directly to the pinion wheel shaft. The electric or hydraulic drive motor may sometimes be provided with a shaft extending down to the pinion wheel to form its shaft, too. A yet further option is a so-called e-pod, where the electric drive motor is coupled directly to the propeller drive shaft.

Since the thruster discussed in this specification may, optionally, be a steerable one, such a thruster has to be made rotatable round the vertical axis. This means that the upper gearbox has to be kept stationary, while the rest of the thruster components are steered, i.e. rotated round their substantially vertical axis. To fulfil this requirement the upper gearbox is fastened by means of an annular cover plate to the hull structure of the marine vessel. The cover plate is provided with means for supporting the rotating part of the thruster in vertical direction, i.e. a set of bearings, and means for rotating the thruster, i.e. a set of gearwheels and at least one motor for rotating the gearwheel. The hull structure below the cover plate is provided with a downwardly tapering shell that, by means of the bearings arranged at its lower end supports the thruster in horizontal direction. Both the upper and lower bearings as well as the gearwheel require lubrication, whereby the tapering shell forms a closed cavity called stembox. As the gearwheels and the upper bearings are located just below the cover plate, their proper and reliable lubrication is a challenging task unless it has been arranged by means of full-bath lubrication. Thus, the stembox is also provided with sealing at its lower end. The stembox is needed only when it is a question of a rotary, i.e. steerable, thruster. In non-rotary thrusters the stembox is replaced with a thuster frame.

Below the stembox there is another cavity, called as the shank that surrounds the bearings of the pinion shaft. In non-rotary thrusters the shank is a part of the thruster frame, too. The shank is also a closed cavity, as the pinion shaft bearings require lubrication. The lower gearbox is normally fastened to the bottom of the shank.

The lubrication of the steerable thruster has been arranged this far by either arranging full oil bath in both the stembox, the shank and the lower gearbox or arranging splash lubrication in each one of these lubricating positions.

Thus, it is evident that the cavities within the thrusters used in marine vessels may be either filled with oil or provided with an oil surface, which is, at least in the lower gearbox, normally at about the level of the axis of the propeller. Such oil compartments have, in principle, two problems that have to be taken into consideration when aiming at ensuring a problem-free and safe operation of the thrusters.

Firstly, all compartments having an air space have a tendency of collecting water from the humidity of the ambient air entering the compartment. For instance, when the temperature of the oil in the lubrication system changes, the volume of the air space changes, whereby the air space has to be vented. In case the oil gets cooler outside air flows in the air space, and if the air is humid, the water condenses in the oil compartment. Also, when the oil compartment, like that of a lower gearbox, is below the sea level, the shaft seals try to prevent both the oil from leaking to the sea and the sea water from entering the oil compartment. However, as the hydrostatic pressure acting on the seals from the sea is relatively high (the lower gearbox may be at a depth of several meters) the seals will eventually start to fail, whereby the oil compartment will sooner or later receive small amounts of sea water. The presence of water in the oil weakens the lubrication capability and causes corrosion in the metal parts of the oil compartment as well as those of the entire lubrication system. The current method of removing the water from oil applies additional expensive filters.

Secondly, a natural characteristic of lubrication oils, i.e. the hydrocarbons is to slowly evaporate. In other words, the lightest elements separate in gaseous form in the gas cavity of the oil compartment. If the same oil compartment contains oxygen, there is a risk of explosion if or when the concentration of the gaseous hydrocarbons gradually grows high enough.

BRIEF SUMMARY OF THE INVENTION

A first object of the present invention is to offer a solution to one or more of the above discussed problems.

A second object of the present invention is to ensure a reliable and safe operation of a propulsion device of a marine vessel.

A third object of the present invention is to suggest an improvement in the lubrication system of a propulsion device for minimizing the water-related problems.

A fourth object of the present invention is to suggest an improvement in the lubrication system of a propulsion device for minimizing the problems caused by evaporated hydrocarbons.

At least one of the above and other objects of the invention are met by a method of improving the lubrication system of a thruster of a marine vessel, the lubrication system having an oil tank and circulation means for circulating oil between the oil tank and the thruster, the thruster comprising drive means, a lower gearbox and a vertical shaft therebetween, the lubrication system further having at least one oil compartment having at least one gas cavity therein, the method comprising the step of maintaining dry atmosphere in said at least one gas cavity.

At least one of the above and other objects of the invention are met by a lubrication system for improving the lubrication system of a thruster of a marine vessel, the lubrication system having an oil tank and circulation means for circulating oil between the oil tank and a thruster, the thruster comprising drive means, a lower gearbox and a vertical shaft therebetween, the lubrication system further having at least one oil compartment having at least one gas cavity therein, and means for introducing dry or dry and inert gas in said at least one gas cavity.

Other characteristic features of the present method of and an arrangement for improving the lubrication system of a propulsion device of a marine vessel will become apparent from the appended dependent claims.

The present invention, when solving at least one of the above-mentioned problems, reduces the disadvantages caused by the presence of water in the lubrication oil, and prevents the risk of explosion in the oil compartments of a thruster.

BRIEF DESCRIPTION OF DRAWING

In the following, the novel method of and an arrangement for improving the lubrication system of a propulsion device of a marine vessel is explained in more detail with reference to the accompanying Figures, of which

DETAILED DESCRIPTION OF DRAWINGS

Figure 1:
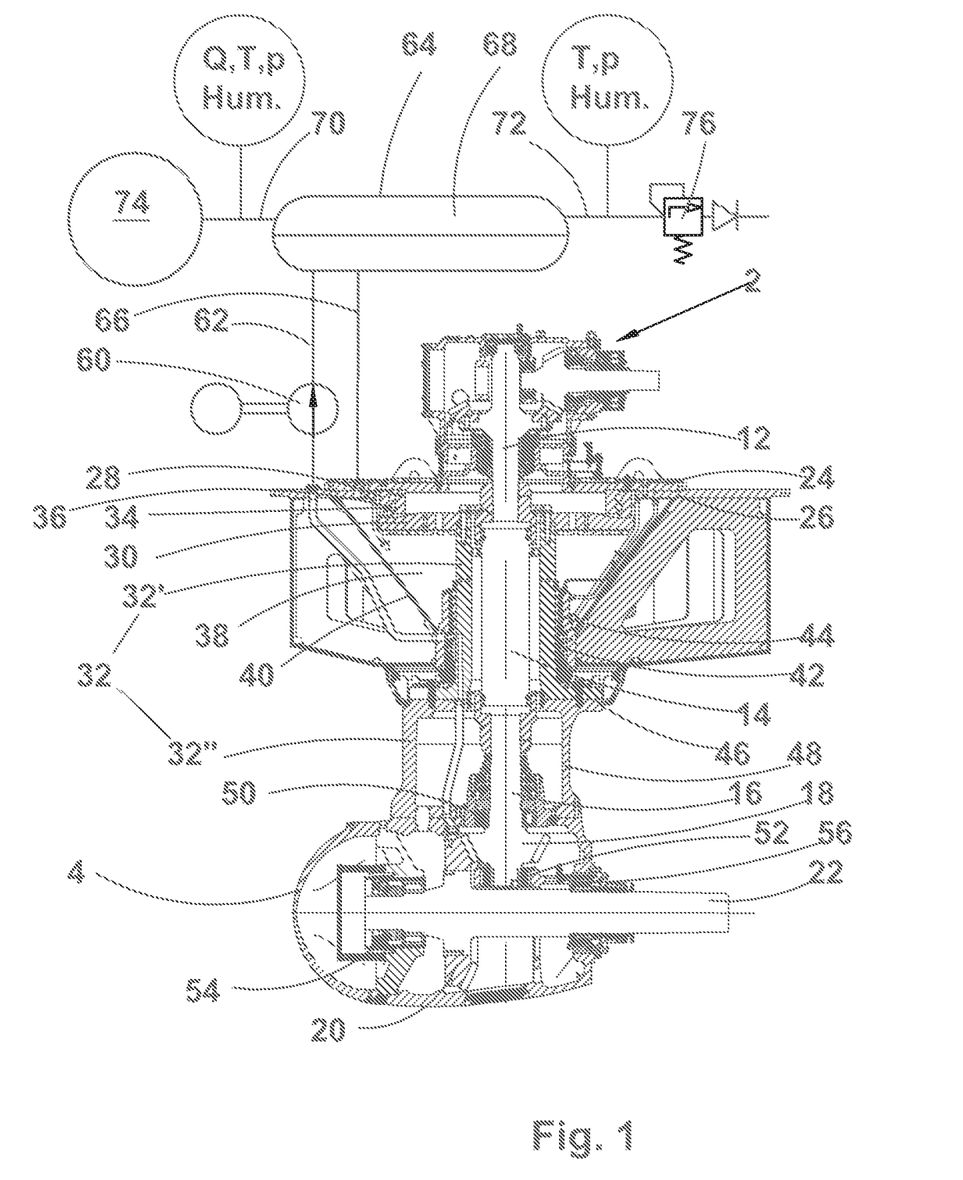
FIG. 1 illustrates schematically as an example of various thrusters a steerable thruster, in connection with which the water removal arrangement in accordance with a first preferred embodiment of the present invention has been arranged.

FIG. 1 illustrates, as an example of thrusters in connection with which the present invention may be used, a mechanically driven (though also electric or hydraulic drives may be used in connection with thrusters) steerable thruster that has three main parts, i.e. the upper gearbox 2, the vertical shaft, and the lower gearbox 4. The upper gearbox 2 includes means for transmitting the power from a substantially horizontal shaft to the vertical shaft, and normally forms, in view of its lubrication an independently functioning unit. The vertical shaft is normally formed of more than one part, i.e. it has at least the upper gearbox shaft 12 extending downwardly from the upper gearbox, and a pinion wheel shaft 16 extending into the lower gearbox. Usually, there is also a so-called intermediate shaft 14 that is arranged between the two other shafts. It has to be understood that he intermediate shaft may be coupled to the upper gearbox shaft and to the pinion wheel shaft with flexible or floating shaft intermediate couplings or the shaft may be replaced with a flexible or floating shaft coupling. The pinion wheel shaft 16 transmits power to a substantially horizontal propeller drive shaft 22. Both the lower end of the pinion wheel shaft 16 and the propeller drive shaft are thus located within the lower gearbox 4.

If the thruster has an electric or hydraulic drive the upper gearbox 2 of the mechanical drive may be replaced with the electric or hydraulic drive. The shaft of the electric or hydraulic drive motor is vertical and connected, preferably by means of a flexible or floating coupling, to the intermediate shaft 14 or directly to the pinion wheel shaft 16. The electric or hydraulic drive motor may sometimes be provided with a shaft extending down to the pinion wheel 18 to form its shaft, too.

Since the exemplary thruster discussed in this specification is a steerable one, the thruster has to be made rotatable round its vertical axis. This means that the upper gearbox 2 is stationary, while the rest of the thruster components are steerable, i.e. rotatable. To fulfil this requirement the upper gearbox 2 is fastened by means of an annular cover plate 24 to the hull structure 26 of the marine vessel. The cover plate 24 has an opening for the vertical shaft, and it is provided with at least one steering motor (not shown) the shaft of which extends substantially vertically through the cover plate 24. The lower end of the shaft of the steering motor is provided below the cover plate 24 with a steering gear pinion that rotates a ring-shaped gearwheel 28 arranged on an annular flange 30 mounted on a vertical shaft housing 32 forming the frame structure of the steerable/rotating thruster. The vertical shaft housing 32 surrounds the vertical shaft and extends downwardly such that the lower gearbox 4 is fastened to the lower end the vertical shaft housing 32. The vertical shaft housing 32 is formed of an upper part called an upper vertical shaft housing 32', and a lower part called a lower vertical shaft housing 32". The upper vertical shaft housing 32' surrounds the floating intermediate shaft 14 (and its couplings or the coupling replacing the intermediate shaft), and the lower vertical shaft housing 32" the pinion wheel shaft 16. The lower face of the cover plate 24 is provided with a ring-shaped support member 34, the radially outer surface of which faces the radially inner surface of the ring-shaped gearwheel 28. A bearing 36 supporting the weight of the vertical shaft housing 32 and the lower gearbox 4 is arranged in connection with the ring-shaped support member 34 and the ring-shaped gearwheel 28. The upper vertical shaft housing 32' is surrounded by a so-called stembox 38 the outer wall 40 (converging conically in FIG. 1) of which is arranged in connection with the hull structure 26 of the marine vessel. The lower end of the stembox outer wall 40 is provided with bearings 42 supporting the upper vertical shaft housing 32' and with a sealing for keeping the lubrication oil within the stembox 38. Above the bearings 42 there is a swivel 44, i.e. a rotary connector for arranging multiple flow communications for liquid and/or gas between the rotary/steerable part of the thruster and the fixed part of the stembox. The flange 30, the ring-shaped gearwheel 28, and the ring-shaped support member 34 with their bearing 36, and the pinion wheel of the steering motor are all located within the stembox 38. Thus, in practice, for ensuring a sufficient, reliable and maintenance-free lubrication of the steering gears and the support bearing, the stembox of a steerable thruster is normally provided with full bath lubrication by filling the stembox with oil. When it is a question of a non-steered thruster it neither has the stembox nor any bearings or sealings requiring lubrication. Also, the above discussed shank is missing, whereby the task of surrounding and supporting the rotary drive shaft of the pinion wheel is performed by a thruster frame.

Below the bearings 42 and the sealing 44 the upper vertical shaft housing 32' terminates to a flange 46 to which the lower vertical shaft housing 32" is attached. The lower vertical shaft housing 32" forms a cavity, so-called shank 48, through which the pinion wheel shaft 16 runs and where the upper bearings 50 of the pinion wheel shaft 16 are located. To the lower end of the lower vertical shaft housing 32" is the lower gearbox 4 fastened. However, in some specific constructions the shank and the lower gearbox are made, i.e. cast as one unit. The lower gearbox, i.e. the lower gearbox 4, is provided with the lower bearing 52 of the pinion wheel shaft 16, and the propeller drive shaft 22 with its bearings 54 and 56. Here it has to be understood that the pinion wheel shaft 16 may be supported within the shank only, i.e. by means of the bearings 50 only, whereby the lower end of the shaft does not need the bearings 52 shown in the drawings.

The lower gearbox 4 contains the gear transmission 18 and 20 transmitting power from the vertical shaft towards the propeller and the bearings 52 (if used), 54 and 56 supporting the shafts 16 and 22. Some friction is present in both the gears and the bearings. Therefore both lubrication and cooling is required.

Usually the lower gearbox 4, the shank 48 and the stembox 38 form one lubrication oil volume, which is filled with oil. In order to be able to cool and filter the oil, the oil is sucked up, out of the thruster from the bottom of the lower gearbox 4. The oil sucked out of the lower gearbox 4 to an oil return path comprising, for example, a tube leading through the shank 48, an axial bore in the upper shaft housing 32', a radial bore in the upper shaft housing 32', a tube at the side of (or optionally in) the stembox 38 is pumped by means of a pump 60 via a tube 62 and through a set of coolers and filters (not shown) to an oil tank 64. The radial bore discussed above ends in a cavity extending circumferentially around the upper shaft housing. Thereby the radial bore in the upper shaft housing is, irrespective of the steering angle of the thruster, in flow communication with the oil discharge tube outside (or optionally within) the stembox 38. The circumferential cavity with a seal above and below forms a rotary connector, which is called a swivel 44. The oil is returned to the thruster from the oil tank 64 by introducing it from the bottom of the oil tank 64 along a tube 66 to the top of the stembox 38. The oil is able to flow downwardly in the thruster, i.e. from the stembox 38 to the shank 48 and from the shank 48 to the lower gearbox 4. The whole system is pressurized by means of placing the oil tank 64 at a certain distance above the thruster. In other words, the stembox, the shank and the lower gearbox form a unitary oil compartment.

In operation water is able to either condense in the lubrication system, for instance in the oil tank 64 or some other compartment having moist air, or leak into the lower gearbox 4, for instance past the propeller shaft sealing. Water in the lubrication system may both weaken the lubrication capability of the oil and increase the risk of corrosion. In accordance with the present invention the lubrication system is provided with means for introducing dry air, preferably dry inert gas, in at least some of the gas cavities in the arrangement. The inert gas, when used, is preferably nitrogen, but also carbon dioxide or some other easily available, cheap inert gas may be used. A viable option for the dry air is standard compressed air, led through a filter that takes out the water. Sometimes the oxygen may also be removed to make the dry air inert.

In connection with the thruster of FIG. 1, i.e. the thruster where oil from the oil tank 64 is introduced, for instance, to the stembox 38 and where the stembox 38, the shank 48, and the lower gearbox 4 have full bath lubrication, the main gas cavity 68 may be found in the oil tank 64. The oil tank 64 is provided, in accordance with a first preferred embodiment of the present invention, with, in addition to an inlet conduit 62 for water-contaminated oil and an outlet conduit 66, preferably at the bottom of the oil tank 64, for introducing oil to the thruster, for instance to the stembox 38 thereof, an inlet duct 70 for dry air, preferably dry inert gas, and an outlet duct 72 for humid gas. The dry air, preferably dry inert gas is introduced into the oil tank 64, i.e. preferably, but not necessarily, into the gas cavity 68 thereof from a pressurized gas source, like a gas container 74 or a compressor. The humid gas is discharged from the oil tank 64 via the outlet conduit 72 to a pressure regulation valve 76 so that a desired pressure may be arranged in the oil tank 64. The cause for the pressurization of the oil tank 64 as well as the operation of the present invention is discussed in more detail later on in this specification. The gas discharged from the pressure regulation valve 76 is preferably allowed to escape to the atmosphere. However, if desired, it is also possible to take the humid gas for further treatment, for instance in the bilge of the marine vessel such that any hydrocarbons entrained in the gas may be removed from the gas. If the gas used for drying the oil is air from which water and oxygen have been removed, a further option is to mix the humid gas with the oxygen that is filtered out, to get the percentage of $O_2$ and $N_2$ back to the standard level in connection with introducing the humid gas to the bilge.

Figure 2:
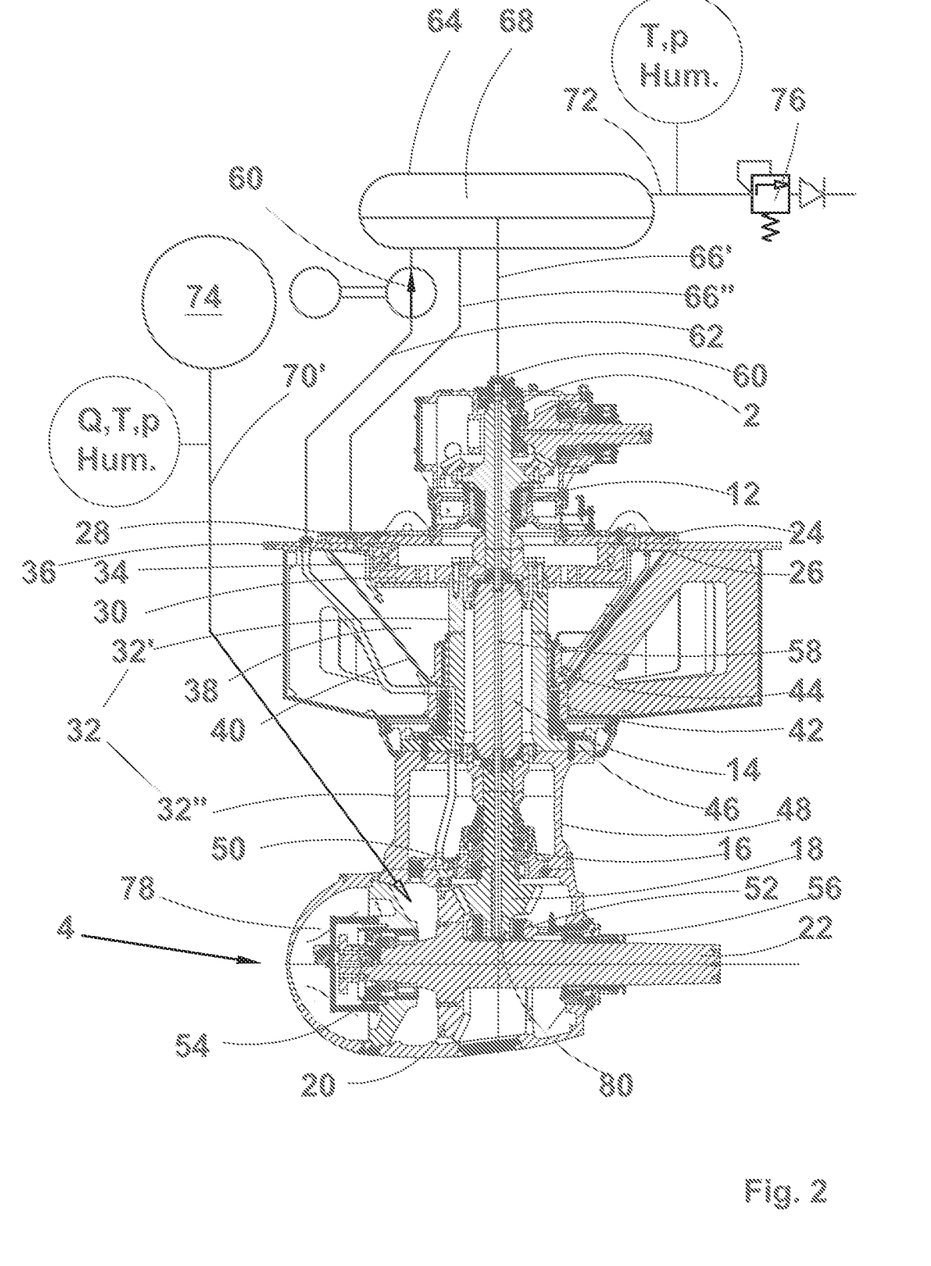
FIG. 2 illustrates schematically as an example of various thrusters a recently designed steerable thruster in connection with which the water removal arrangement in accordance with a second preferred embodiment of the present invention has been arranged.

FIG. 2 illustrates the thruster in accordance with a recently designed construction. The basic structure of the thruster is similar to that shown in FIG. 1. Thus the same components are referred to by the same reference numerals.

As a novel feature the lower gearbox 4 of FIG. 2 is provided with a splash-type lubrication, the oil surface being preferably at about the level of the axis of the propeller shaft 22, whereas the stembox 38 and the shank 48 have full-bath lubrication. Also in this construction the lubrication oil is circulated, i.e. pumped from the lower gearbox to an oil return path comprising, for example, a tube leading through the shank 48, an axial bore in the upper shaft housing 32', a radial bore in the upper shaft housing 32', a tube at the side of (or optionally in) the stembox 38 by means of a pump 60 via a tube 62 to an oil tank 64. The oil level is maintained in the lower gearbox 4, preferably, but not necessarily, at about the centre of the gearwheel 20 while the oil is circulated. For maintaining the desired oil level in the lower gearbox an oil passage 66', 58 directly from the oil tank 64 to the lower gearbox 4 is arranged. The oil passage 66' includes an overflow in the oil tank 64 for controlling the oil level in the lower gearbox 4. There is also another route for oil from the oil tank 64, i.e. a flow passage 66" from the bottom of the oil tank 64 to the stembox 38 of the thruster for introducing lubrication oil to the stembox 38. Normally the stembox 38 and shank 48 are in flow communication with each other such that oil from the stembox 38 is easily able to flow to the shank 48. If the stembox 38 is not needed the oil passage 66" leads directly to the shank 48. The oil may flow further from the stembox 38 and shank 48 to the lower gearbox 4, however such that a constriction or restriction is arranged at the oil flow path between the shank 48 and the lower gearbox 4, whereby the amount of oil entering the lower gearbox from the shank is only a fraction of the oil coming along the direct route. Another option would, naturally, be an independent oil circulation from the shank 48 via an oil filter and an oil cooler to the oil tank 64 by means of another circulation pump. Sometimes even independent oil circulations from both the shank 48 and the stembox 38 to the oil tank 64 may be considered.

The oil passage 66' running directly from the overflow in the oil tank 64 to the lower gearbox 4, may, as a first option, be arranged via a bore 58 along the entire length of the vertical shaft, i.e. in the structural embodiment shown in the drawings the bore 58 is arranged in each part of the vertical shaft. Additionally, a rotary pipe coupling 60 has been arranged at the upper end of the upper gearbox shaft 12 and couplings between the parts of the vertical shaft so that oil may flow down to the pinion wheel shaft 16 and further in the lower gearbox 4. A second option (not shown in the drawings) is to arrange an oil pipeline from the overflow in the oil tank 64 either inside the stembox 38 or outside the stembox 38 for taking oil from the oil tank 64 to the sealing/bearing housing at the lower end of the stembox 38. The connection from stationary hull structures to the rotary vertical shaft housing 32' is easy to arrange via the sealing 44. Here, the oil may be taken to an annular channel that is by means of a radial conduit in flow communication with a substantially vertical conduit in the vertical shaft housing taking oil down to the shank 48. In the shank 48 a pipe running through the shank 48 down to the lower gearbox 4 may be arranged for taking oil further down to the lower gearbox 4.

In case the thruster has an electric or hydraulic drive both above discussed ways of providing oil from the oil tank to the lower gearbox may be used. In other words, an axial bore may be arranged along the shaft of the electric or hydraulic drive motor, or an external oil pipeline as discussed above may also be used.

In addition to a passage taking oil from the oil tank 64 to the lower gearbox 4, the lower gearbox 4 has to be provided with a ventilation conduit as the oil level in the lower gearbox may change. Such a conduit is preferably, but not necessarily, arranged between the lower gearbox 4 and the oil tank 64. The ventilation conduit may, in principle, run along with the above discussed external oil pipeline (for example, at a side thereof) as a separate conduit, or the oil pipe, including both the above-discussed oil pipeline and the oil passage 66' and the bore 58 in the vertical shaft, may be dimensioned such that the oil flowing downwardly never fills the pipe/bore, but leaves enough room for the air or gas to escape from the lower gearbox 4 up to the oil tank 64.

The oil circulation, for instance for the purpose of filtering and/or cooling of the oil, from the stembox 38 and the shank 48 is arranged to take place via the lower gearbox 4. In other words, the oil that lubricates the steering gear pinion, its gearwheel and the support bearing 36 below the cover plate 24 has direct access between the intermediate shaft 14 and the upper vertical shaft housing 32' to the shank 48. The same oil has also access via openings through the flange 30 into the stembox 38 for lubricating the sealing 44 at the bottom of the stembox 38 between the stationary hull structures 26 (including the stembox wall 40) and the rotary upper vertical shaft housing 32'. The stembox 38 is in communication with the shank 48 by means of holes in the upper vertical shaft housing 32' for allowing oil flow from the stembox 38 to between the intermediate shaft 14 and the upper vertical shaft housing 32'. Thus the stembox 38 and the shank 48 form, in practice, the same oil compartment.

The oil circulation out of this compartment is adjusted, in this particular structure, by means of a constriction or a restriction arranged between the shank 48 and the lower gearbox 4. In operation a small amount of oil flows from the oil tank 64 to the stembox 38, to the shank 48 and finally into the lower gearbox 4. The flow also enables circulation and filtration of the oil going through the stembox 38 and the shank 48. To make sure the oil flows from the shank 48 towards the lower gearbox 4, the pressure within the shank 48 needs to be higher than that within the lower gearbox 4. This is arranged with the combination of the direct connection 58, 66' from the oil tank 64 to the lower gearbox 4, the constriction and the ventilation of the lower gearbox 4 to the oil tank 64. The direct oil flow from the oil tank 64 is arranged by placing the oil exit opening in the lower gearbox 4 above the oil level in the lower gearbox 4, and, in accordance with a preferred alternative, arranging the bore 58 along the vertical shaft so wide that oil flows along the bore inner surface leaving an open center for the ventilation. Naturally, if the lower gearbox ventilation has been arranged in some other manner, the bore 58 may be filled with oil. The pressure within the lower gearbox 4 is, as a consequence, equal to the pressure within the oil tank 64. The pressure in the shank 48 is equal to the pressure within the oil tank 64 plus the additional pressure corresponding to the height of the oil from the bottom of the shank 48 up to the oil level in the oil tank 64, i.e. the hydrostatic pressure. As a consequence, the pressure within the shank 48 will always be higher than that in the lower gearbox 4 and the oil will flow from the shank 48 to the lower gearbox 4.

To make the splash lubrication in the lower gearbox 4 work, the oil level is to be maintained, preferably, but not necessarily, substantially at bout the centre of the gear wheel 20, i.e. at the level of the axis of the propeller shaft 22. The oil level in the lower gearbox 4 is controlled by regulating the oil level in the oil tank 64. The principle of the level control system is based on an invariable amount of oil in the system. As a consequence the amount of oil in the lower gearbox 4 is the total amount of oil in the system minus the amount of oil within the shank 48, the stembox 38 and the oil tank 64. The shank 48 and the stembox 38 are both completely filled with oil.

In connection with the thruster of FIG. 2, i.e. the thruster having a full bath lubrication in the stembox 38 and in the shank 48, and half bath lubrication in the lower gearbox 4 there are two gas cavities 68 and 78. One 78 in the lower gearbox 4 and another 68 in the oil tank 64. Now that the risk of water ingress is the greatest at the lower gearbox 4, the lower gearbox 4 is provided, in accordance with a second preferred embodiment of the present invention an inlet duct 70' (shown schematically) for dry air, preferably dry inert gas, and an outlet duct 80 for humid gas. The dry air, preferably dry inert gas is introduced to the lower gearbox 4 at a desired pressure from a pressurized gas source, like a gas container 74. The dry air, preferably dry inert gas inlet duct 70' may be arranged to run in the same manner as discussed above in connection with the external oil introduction pipeline. In other words, the gas inlet duct may run either inside the stembox or outside the stembox for taking dry air, preferably dry inert gas from the gas source to the swivel 44 at the lower end of the stembox. The connection from stationary hull structures to the rotary vertical shaft housing is easy to arrange via the swivel 44. The dry air, preferably dry inert gas may be taken to an annular channel that is by means of a radial conduit in flow communication with a substantially vertical conduit in the vertical shaft housing taking dry air, preferably dry inert gas down to the shank. In the shank a pipe running through the shank down to the lower gearbox may be arranged for taking the dry gas further down to the lower gearbox. The discharge of the humid gas takes place via an outlet duct 80, which, in this embodiment runs along the conduit the lubrication oil is introduced into the lower gearbox 4. In other words, the humid gas is taken out of the gas cavity 78 of the lower gearbox 4 via the ventilation duct. FIG. 2 illustrates the ventilation duct/oil introduction conduit 80/66' and 58 to run directly from the overflow in the oil tank 64 into the lower gearbox through a bore 58 in the vertical shaft. The same route, but in opposite direction is used as the outlet duct 80 for the humid gas. Another option is naturally to arrange the less direct duct arrangement through the shank 48 and beside or through the stembox 38 up to the oil tank 64 wide enough to allow humid gas discharge from the lower gearbox 4 in addition to the possibly simultaneous oil introduction thereinto. The humid gas is taken from the gas cavity 68 of the oil tank 64 to the pressure regulation valve 76 as shown in FIG. 2. The gas is preferably allowed to escape to the atmosphere, but, if desired, it is also possible to take the humid gas for further treatment, for instance in the bilge, such that any hydrocarbons entrained in the gas may be removed from the gas. If the gas used for drying the oil is air from which water and oxygen have been removed, a further option is to mix the gas with the oxygen that is filtered out, to get the percentage of $O_2$ and $N_2$ back to the standard level in connection with introducing the humid gas to the bilge.

Figure 3:
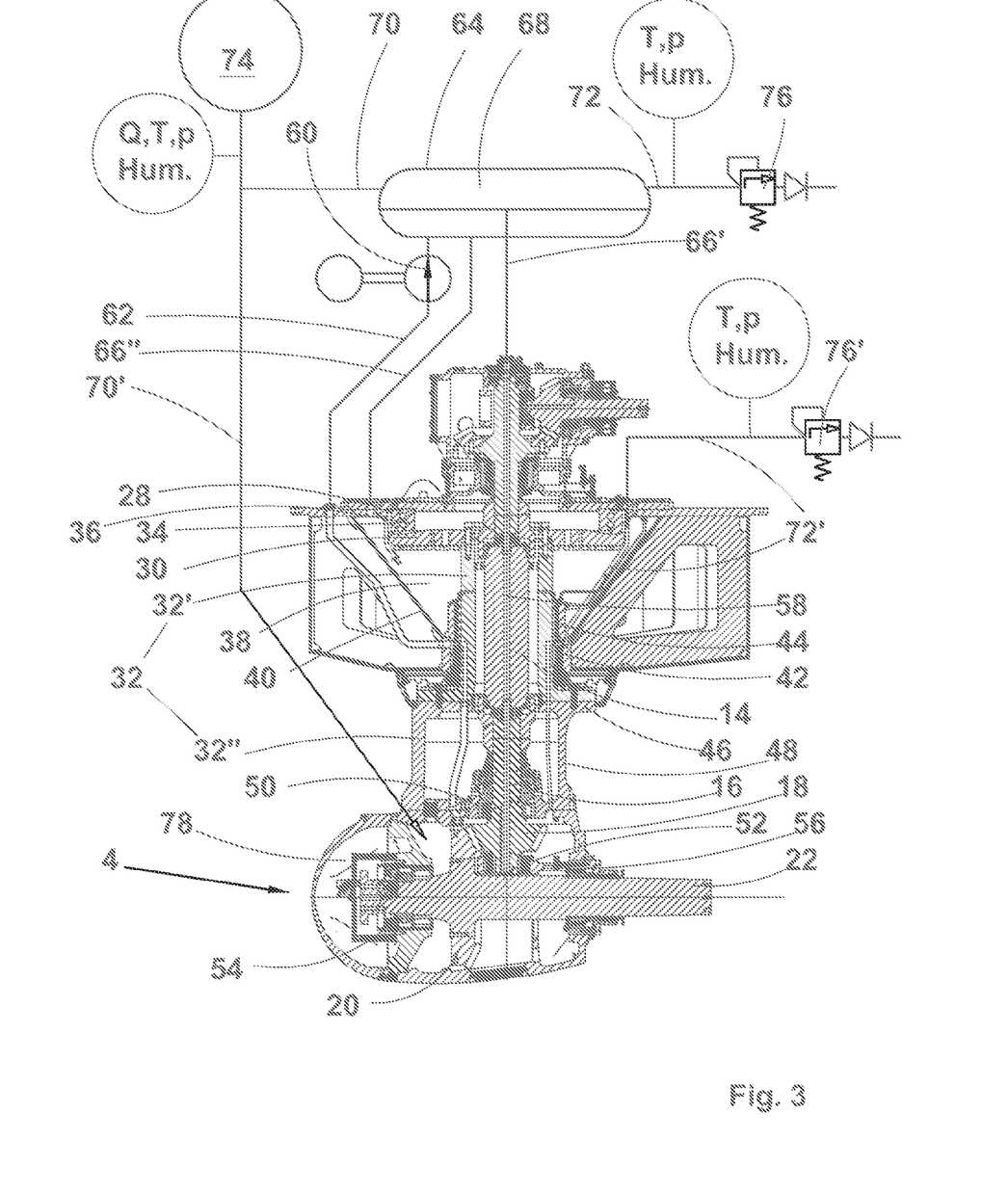
FIG. 3 illustrates schematically as an example of various thrusters a recently designed steerable thruster in connection with which the water removal arrangement in accordance with a third preferred embodiment of the present invention has been arranged.

FIG. 3 illustrates a third preferred embodiment of the present invention. the humid gas may introduced into the gas cavity 78 of the lower gearbox 4 in a similar manner as discussed in connection with FIG. 2. However, in this embodiment the humid gas is discharged from the lower gearbox 4 and the thruster along a different route or duct 72' directly to a pressure regulation valve 76' so that a desired pressure prevails in the lower gearbox 4. For example the discharge duct 72' of the humid gas from the lower gearbox 4 has an inlet duct opening at the top cover of the lower gearbox 4 to which a pipe leading the gas through the shank 48 has been attached. The pipe terminates at its upper end to a, preferably axial, bore in the top cover of the shank 48. The bore opens to another, preferably axial, bore in the shaft housing 32' which bore terminates to a radial bore that takes the gas to the swivel 44. From there the gas continues either outside or inside the stembox 38 along a pipe 72' above the stembox 38, and further through the pressure regulation valve 74' out of the lubrication system. The gas is preferably allowed to escape to the atmosphere, but, if desired, it is also possible to take the humid gas for further treatment, for instance in the bilge, such that any hydrocarbons entrained in the gas may be removed from the gas. If the gas used for drying the oil is air from which water and oxygen have been removed, a further option is to mix the gas with the oxygen that is filtered out, to get the percentage of $O_2$ and $N_2$ back to the standard level in connection with introducing the humid gas to the bilge.

In this case neither the direct connection 66' from the oil tank 64 to the lower gearbox 4 nor the optional oil introduction pipeline is used for discharging humid gas from the lower gearbox 4. Thus, in view of the oil tank 64 there are two options; either not arrange any dry or dry and inert atmosphere in the oil tank 64, or to provide the oil tank 64 with a separate inlet duct 70 for the dry, and preferably inert, gas and a separate outlet duct 72 for the humid gas, as shown in FIG. 3.

Figure 4:
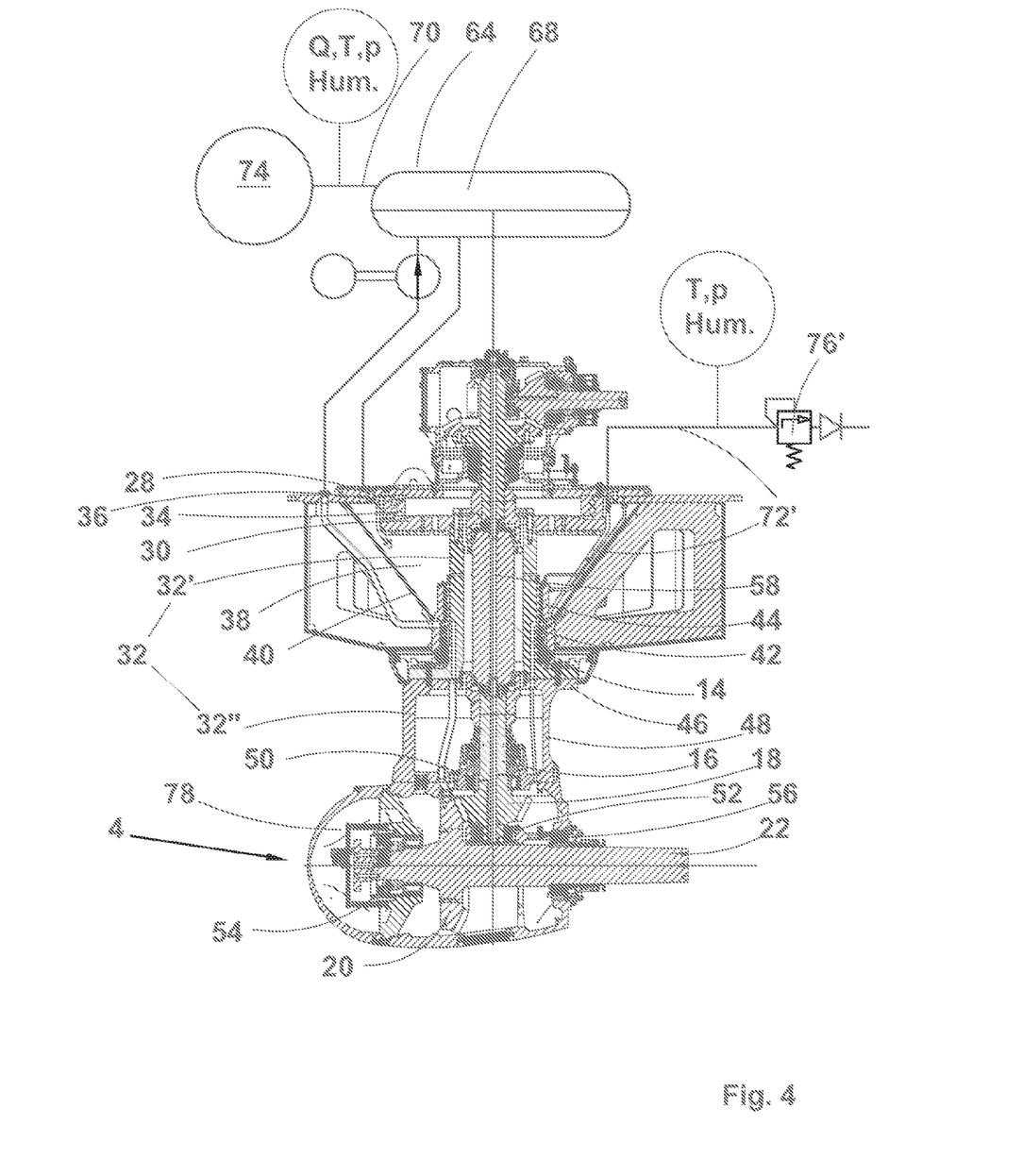
FIG. 4 illustrates schematically as an example of various thrusters a recently designed steerable thruster in connection with which the water removal arrangement in accordance with a fourth preferred embodiment of the present invention has been arranged.

In accordance with a fourth preferred embodiment of the present invention the dry air, preferably dry inert gas is introduced in the oil tank 64 as shown in FIG. 4. In this embodiment the gas is discharged from the gas cavity 68 of the oil tank 64 to the gas cavity 78 of the lower gearbox 2 either along the bore 58 in the vertical shaft, or along a gas passage of its own. In the latter case the gas passage may be similar to the one discussed in connection with the second embodiment with the exception that the gas passage now has its origin in the oil tank 64, and not in the gas source. For the discharge of humid gas from the gas cavity 78 of the lower gearbox a gas exit duct 72' is needed. Such an exit duct may be made to run at a side of the gas introduction duct, though, at the lower gearbox, it is preferable that the two gas ducts do not open side by side allowing the dry, preferably dry and inert, gas flow to short-circuit directly from the inlet duct to the outlet duct. Thus, in principle the gas discharge conduit 72' from the lower gearbox 4 to the pressure regulation valve 76' may be similar to the one discussed in connection with the third embodiment in FIG. 3.

In other words in the third and in the fourth embodiment of the present invention the same dry, preferably dry and inert, gas is made to flow through the lower gearbox and the oil tank. Just the flow direction changes between the two embodiments.

The present invention functions such that when dry and possibly inert gas is introduced into at least one gas cavity 68, 78, the water in the oil evaporates easily as the partial pressure of water vapor in the gas cavity is very low. Thus, by means of the present invention not only the gas cavity 68, 78 is flushed but the liquid water is encouraged to evaporate, whereby the oil is "dried". As an example, the following experiment shows the effect of the present invention. Six liters of water was mixed with to 2000 liters of oil. For two days (48 hours) dry nitrogen was made to flow (7 liter/min, 1.7 bar (abs)) via the gas cavity of the oil container. When measuring the humidity of the nitrogen discharged from the container it was learned that the humidity dropped in those 48 hours from 3000 PPM to 1300 PPM. The result is a clear indication that the water content in the oil was reduced significantly.

Preferably, the lubrication and water separation arrangement of all embodiments of the present invention are provided with means for determining the amount (Q, dm³/s) of dry and possibly inert gas entering the lubrication system, and means measuring the temperature (T, ° C.), pressure (p, bar) and humidity (Hum., % H$_2$O) of the gas both at the inlet duct to the lubrication system and at the outlet duct from the lubrication system (see FIG. 1). With this information it is possible to follow, not only the functioning of the arrangement, but also the condition of the lubrication oil, or the condition of the sealing of the lubrication system, or, more generally, that of the thruster. For instance, if the humidity of the gas leaving the oil tank starts increasing while the rest of the variables remain constant, it is a clear indication of water leaking in the lubrication system. Possibly, it is a question of a leak in the sealing of the propeller shaft.

When using the lubrication system utilizing the drying capability of the dry and possibly inert gas there are a few additional features that may be taken into use. Firstly, an overpressure or raised pressure may be arranged in the lower gearbox so that the pressure is relatively close to the hydrostatic pressure outside the lower gearbox, i.e. in the sea. This measure results in a small pressure difference over the shaft sealing whereby the seals are subjected to a significantly lower load than in prior art thrusters where no pressure-compensation has been done. This is especially true when considering the lower gearboxes having a splash-type lubrication. Naturally, this also minimizes the risk of water ingress in the lower gearbox. Another advantage gained from the use of overpressure in the lubrication system is that in case the arrangement, for instance the cover of the oil tank, is leaking the leak takes place from inside to the ambient air, whereby no humid oxygen-containing gas is able to enter the arrangement. This both minimizes the risk of explosion even further, and ensures that no outside humidity is able to enter the lubrication system.

At this stage it should be understood that the present invention may also be used only for eliminating the risks of explosion, which means that the lubrication system, or rather its gas cavities are not continuously flushed by the inert gas, but the gas cavities are just filled with inert gas. In such a case the arrangement has to be provided with means for taking into account the thermal expansion of the lubrication oil. The options are expanding/contracting means in connection with the oil tank, or means for adding or releasing inert gas due to a change in the volume of the gas cavity in the lubrication system.

There is a further aspect relating to the routing of gas in the thruster having a half-bath lubrication in the lower gearbox. When the system is in idle (the thruster is not running) the lower gear box is filled with oil, as the pumps circulating the oil are not running and the oil gradually flows via the stembox and shank to the lower gearbox. Thereby, the oil level in the tank is low and the volume of the gas space in the oil tank is substantially large. Now, in accordance with the present invention the gas space is filled with dry and possibly inert gas (for instance N$_2$). When the system is starting up/running, oil is pumped from the lower gearbox to the oil tank and the dry and possibly inert gas (like N$_2$) from the tank is allowed to flow down to the lower gearbox for filling the void in the gearbox. Thus a gas duct 66'+58 should preferably be arranged between the tank and the lower gearbox. Flushing the oil over to the tank is needed to remove the water from the oil unless the dry and possibly inert gas from the lower gearbox is circulated back to the oil tank or vented out of the system.

In view of the above it should be understood that the present invention may be used in connection with all kinds of propulsion devices of marine vessels that have a lubrication system with a cavity for gas. Also it should be remembered that there may be gas cavities elsewhere in the lubrication system, like for instance in the shank or in the stembox. Thus it is possible that a similar dry air, preferably dry inert gas introduction and discharge arrangement is provided to each gas cavity, or one or more gas cavities may be connected to the same dry and possibly inert gas introduction and discharge arrangement.

It should be understood that the above is only an exemplary description of a novel and inventive method of and an arrangement for removing water from the lubrication oil of a propulsion device of a marine vessel. It should be understood that the above description discusses only a few preferred embodiments of the present invention without any purpose to limit the invention to the discussed embodiments and their details only. Thus the above specification should not be understood as limiting the invention by any means but the entire scope of the invention is defined by the appended claims only. From the above description it should be understood that separate features of the invention may be used in connection with other separate features even if such a combination has not been specifically discussed in the description or shown in the drawings.

The invention claimed is:

1. A method of improving the lubrication system of a thruster of a marine vessel:
   the lubrication system having;
      an oil tank and circulation means for circulating oil between the oil tank and a thruster,
      the thruster comprising drive means, a lower gearbox and a vertical shaft therebetween; and
      at least one oil compartment having at least one gas cavity therein; and
   maintaining a dry atmosphere in said at least one gas cavity by introducing dry gas from a pressurized gas source into said at least one gas cavity.

2. The method as recited in claim 1, further comprising introducing dry inert gas into said at least one gas cavity.

3. The method as recited in claim 1, further comprising introducing the dry gas in said at least one gas cavity and discharging humid gas from said at least one gas cavity.

4. The method as recited in claim 1, further comprising introducing the dry gas in one gas cavity and discharging humid gas from another gas cavity.

5. The method as recited in claim 1, further comprising discharging humid gas from said at least one gas cavity via a pressure regulation valve.

6. The method as recited in claim 1, further comprising:
   a) providing said at least one gas cavity in one of the oil tank and the lower gearbox, and
   b) introducing the dry gas to said at least one gas cavity in the oil tank or the lower gearbox, and
   c) discharging humid gas from said at least one gas cavity in the oil tank or the lower gearbox.

7. The method as recited in claim 3, further comprising:
   a) providing said one gas cavity in the lower gearbox,
   b) providing said another gas cavity in the oil tank,
   c) introducing the dry gas to said one gas cavity in lower gearbox,
   d) discharging the humid gas from said one gas cavity in the lower gearbox to said another gas cavity in oil tank and e) discharging the humid gas from said another gas cavity in the oil tank via the pressure regulation valve.

8. The method as recited in claim 3, further comprising:
a) providing said one gas cavity in the oil tank,
b) providing said another gas cavity in the lower gearbox,
c) introducing the dry gas to said one gas cavity in the oil tank
d) discharging the humid gas from said one gas cavity in the oil tank to said another gas cavity in the lower gearbox, and
e) discharging the humid gas from said another gas cavity in the lower gearbox via the pressure regulation valve.

9. The method as recited in claim 2, further comprising allowing water vapor to separate from the oil in said at least one gas cavity and removing water vapor from said at least one gas cavity.

10. The method as recited in claim 2, further comprising:
a) providing said gas cavity with an inlet duct and an outlet duct for said dry gas for flushing said at least one gas cavity, and
b) determining the humidity of the gas both in an inlet duct to and in an outlet duct from said at least one gas cavity.

11. The method as recited in claim 1, further comprising arranging an overpressure in said at least one gas cavity.

12. The method as recited in claim 11, further comprising providing the lower gearbox of the thruster with a propeller shaft and with a shaft sealing, and by lowering the pressure difference over the shaft sealing by means of the overpressure.

13. The method as recited in claim 1, further comprising:
a) providing a gas cavity in at least one of the stembox, and the shank,
b) introducing dry inert gas to the gas cavity in at least one of the stembox, and the shank, and
c) discharging humid inert gas from the gas cavity in at least one of the stembox, and the shank.

14. The method as recited in claim 2, further comprising either allowing the humid gas to escape to the atmosphere, or taking the humid gas for further treatment for removing any hydrocarbons entrained in the gas.

15. An arrangement for improving the lubrication system of a thruster of a marine vessel comprising:

a lubrication system having an oil tank and circulation means for circulating oil between the oil tank and a thruster, the thruster comprising drive means, a lower gearbox and a vertical shaft therebetween, the lubrication system further having at least one oil compartment having at least one gas cavity therein;
a pressurized gas source; and
means for introducing dry or dry and inert gas in said at least one gas cavity from the pressurized gas source.

16. The arrangement as recited in claim 15, wherein said at least one gas cavity is provided with an inlet duct and an outlet duct for gas, the inlet duct being arranged in flow communication with a source of dry or dry and inert gas.

17. The arrangement as recited in claim 15, wherein the oil tank is provided with a gas cavity.

18. The arrangement as recited in claim 15, wherein the lower gearbox is provided with a gas cavity.

19. The arrangement as recited in claim 15, wherein the thruster has, in addition to the oil tank and the lower gearbox, a stembox and/or a shank, and that the shank and/or the stembox are/is provided with a gas cavity.

20. The arrangement as recited in claim 16, wherein the outlet duct of the gas cavity is provided with a pressure regulation valve for maintaining a desired pressure in the gas cavity.

21. The arrangement as recited in claim 15, further comprising a gas duct for the gas arranged between the oil tank and the lower gearbox.

22. The arrangement as recited in claim 21, wherein the gas duct comprises a bore along the vertical shaft.

23. The arrangement as recited in claim 20, wherein the pressure regulation valve is in flow communication with the gas cavity of at least one of the oil tank, the stembox, the shank, and the lower gearbox.

24. The arrangement as recited in claim 16, wherein the inlet duct to and the outlet duct from the at least one gas cavity are provided with a humidity sensor.

25. The arrangement as recited in claim 15, wherein the pressurized gas source is one of a gas container and a compressor.

* * * * *